Figure 1:
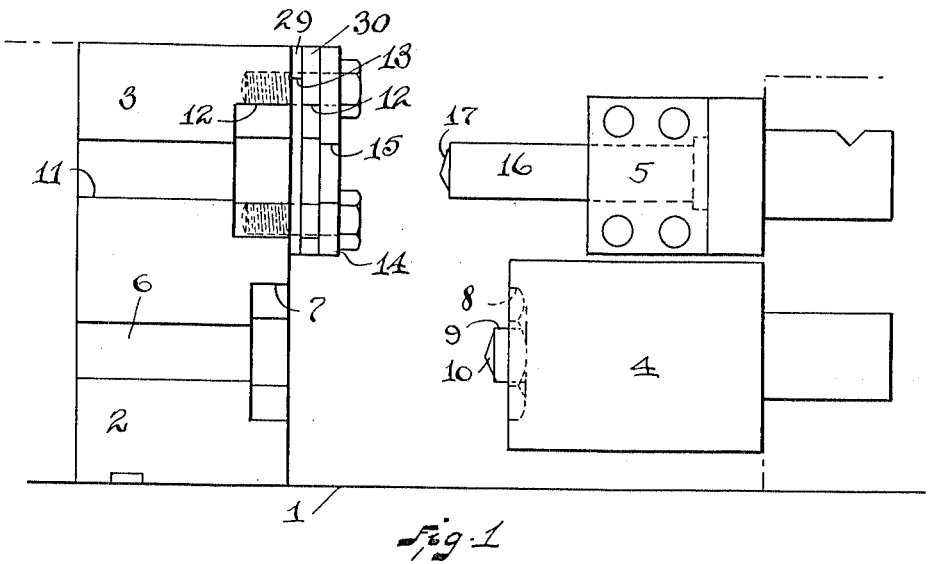

J. R. BLAKESLEE.
METHOD OF MAKING NUTS AND THE LIKE.
APPLICATION FILED MAY 2, 1914.

1,119,775.

Patented Dec. 1, 1914.

2 SHEETS—SHEET 1.

Witnesses:
O. M. Kappler
Robert M. Sxe

Inventor
John R. Blakeslee
By Fay & Oberlin
Attorneys

J. R. BLAKESLEE.
METHOD OF MAKING NUTS AND THE LIKE.
APPLICATION FILED MAY 2, 1914.

1,119,775.

Patented Dec. 1, 1914.
2 SHEETS—SHEET 2.

Witnesses=
O. M. Kappler
Robert M. See

Inventor
John R. Blakeslee
By Fay & Oberlin
Attorneys—

UNITED STATES PATENT OFFICE.

JOHN R. BLAKESLEE, OF CLEVELAND, OHIO.

METHOD OF MAKING NUTS AND THE LIKE.

1,119,775.       Specification of Letters Patent.       Patented Dec. 1, 1914.

Original application filed February 4, 1913, Serial No. 746,137. Divided and this application filed May 2, 1914. Serial No. 835,865.

*To all whom it may concern:*

Be it known that I, JOHN R. BLAKESLEE, a citizen of the United States, and a resident of Cleveland, county of Cuyahoga, and State of Ohio, have invented a new and useful Improvement in Methods of Making Nuts and the like, of which the following is a specification, the principle of the invention being herein explained and the best mode in which I have contemplated applying that principle, so as to distinguish it from other inventions.

The present invention provides a method for making nuts and similar articles from a bar of stock without the necessity of preliminarily shaping the bar, so that the bar treated by the present method may be of substantially uniform cross-section.

The invention of the method forming the subject matter of this application was originally claimed in applicant's application Serial No. 746,137, filed February 4, 1913, of which the present application is a division.

According to the present invention, a bar of stock is subjected to the action of suitable mechanism to exteriorly form its end into the general shape desired in the finished article. At the same time a hole is formed partially through the shaped end of the bar and the hole is alined with the unshaped portion of the bar and has a cross-sectional area at least co-extensive with that of the bar. In the initial operation upon a bar of stock, in forming the whole partially through the shaped end of the bar, a conical depression is formed at the bottom or inner end of the hole. After the operative steps just described, the bar is subjected to suitable mechanism to complete the formation of the hole so that it extends entirely through the shaped end of the bar, and since the hole is alined with, and co-extensive in cross-sectional area with, the bar, this completion of the hole will sever the shaped end from the body of the bar. In the operation of completing the formation of the hole, and thus severing the shaped end from the bar, the conical depression which existed at the bottom of the partially formed hole is preserved so that it exists in the end of the bar of stock after the severance of the shaped end portion.

The invention also comprises trimming the exterior of the shaped end of the bar so that upon severance from the bar a finished article is produced. After severance of the shaped end of the bar as a finished article, the remainder of the bar is again subjected to the first operation and the cycle is repeated until all of the bar of stock has been formed into the desired articles. The conical depression may be formed initially in the end of the bar of stock before the initial operation of forming the end of the bar into the desired exterior shape and forming a hole partially therethrough, or such depression may be formed in the operation of forming the hole partially through the initially shaped end of the bar. In either event the depression is thereafter maintained in the end of the bar until all of the bar has been formed.

One suitable mechanism for practising the method constituting the present invention is that described in my application to which reference has been made. That mechanism is illustrated in the annexed drawings, in which,—

Figure 2:
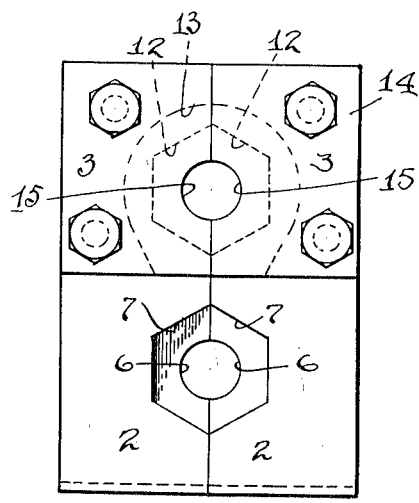
Figure 3:
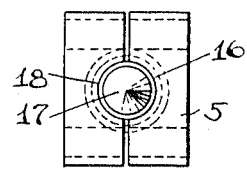
Figure 4:
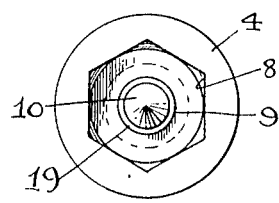
Figure 5:
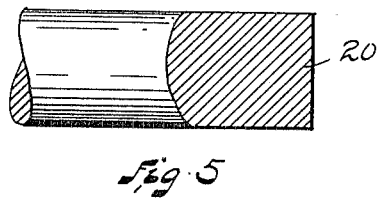
Figure 6:
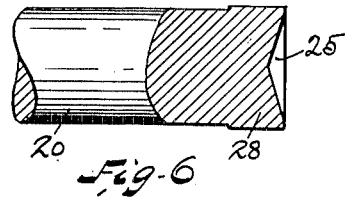
Figure 7:
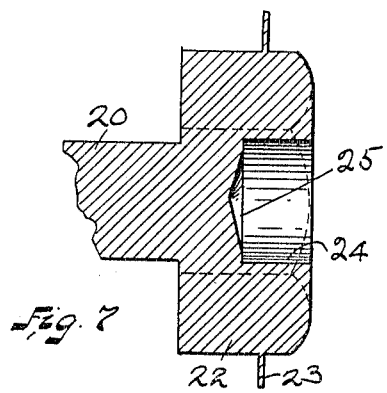
Figure 8:
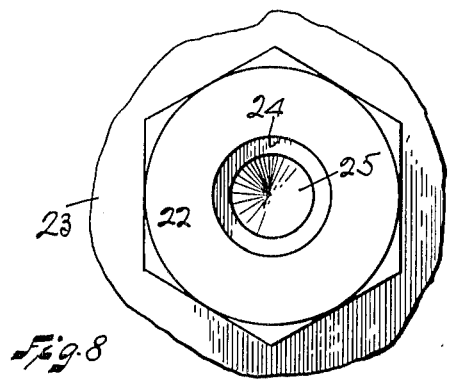
Figure 9:
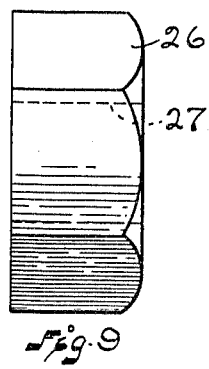
Figure 10:
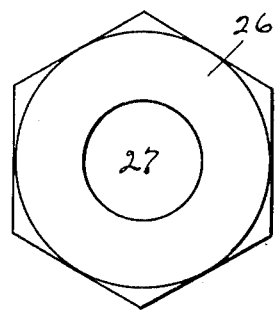

Figure 1 is a side elevation of two dies complementary with two dies not shown, and of two reciprocable plungers coöperative with the dies; Fig. 2 is a front elevation of the dies in closed position; Fig. 3 is a front elevation of the upper reciprocable plunger shown in Fig. 1; Fig. 4 is a front elevation of the lower reciprocable plunger; Fig. 5 is a broken, partly sectioned view of a bar of stock; Fig. 6 is a similar view of the bar of stock after a nut has been severed from it; Fig. 7 is a sectional view of the bar of stock after the first operation of the machine; Fig. 8 is an end elevation thereof; Fig. 9 is a side elevation of a completed nut; and Fig. 10 is a front elevation thereof.

The complete machine includes a machine bed 1 and mechanism for actuating the various parts of the machine, but since the bed and actuating mechanism are of ordinary construction, the mechanism has not been illustrated and the machine bed is merely diagrammatically illustrated. Two dies 2 are mounted on the bed, one fixedly and one transversely reciprocable and above the dies 2, two dies 3 are similarly mounted, the dies 3 being either separate from the dies 2 or integral therewith, as shown in the drawings. A plunger 4 suitably supported, is reciprocable toward and from the dies 2, and a plunger 5 is reciprocable toward and from the dies 3, and the two plungers may be reciprocable in unison or individually.

The two dies 2 are formed longitudinally with complementary recesses 6 adapted when the dies are closed, to grip a bar of stock extending through the dies, and this recess in the closed dies will preferably and generally be cylindrical in cross section. In the front face of the dies 2 are formed two complementary recesses 7 which are of the cross sectional shape of the nut the machine is designed to manufacture. The reciprocable plunger 4 which is disposed opposite the dies 2, is preferably formed with a recess 8 in its front face complementary with the recess 7 in the dies 2, so that when the plunger is advanced until its face contacts with the face of the dies 2, the recesses 7 and 8 together will form the desired exterior shape of the nut to be made. It is to be understood, however, that the plunger 4 may be formed without the recess 8 and dependence placed upon a recess 7 to form the nut. A punch 9 projects from the front face of the plunger 4 and its body is of uniform cross sectional shape and at least co-extensive in cross sectional area with the recess 6 with which it is alined; the uniform body of the punch 9 has at its end a conical portion 10, the base of which is of less width than the body 9, so that a shoulder 19 is left at the end of the punch. The length of the body of the punch projecting beyond the face of the plunger 4 is less than the depth of the recess 7, so that when the plunger is in advance position the punch will extend into the recess but will not extend to the inner end thereof.

The dies 3 are formed with complementary recesses 11 and the recess formed thereby when the dies are closed is slightly larger than the recess 6 of the closed dies 2. The end of the recess 11 toward the front face of the dies opens into a recess 12 formed by complementary recesses in the two dies 3, the recess 12 being of the same cross sectional shape as the recess 7. The recess 12, however, is formed between its ends with a peripheral enlargement 13 and the portion of the recess 12 inwardly beyond the enlargement 13 is of greater depth than the depth of the recess 7 and preferably greater than the depth of the nut to be made. A preferable construction of the dies 3, in order to form the enlargement 13, is to bolt a plate 29 between plate 30 and the face of the dies 3, the plate 30 having an opening conforming with the recess in the dies themselves, while the plate 29 is formed with the enlarged opening 13. A plate 14 is bolted outside of the plate 30, and is formed with an opening 15 of substantially the same size as the recess 11, and serves in the operation of the machine as a stripping plate. The plunger 5 carries a punch 16, the body of which is of uniform size in cross section, and at least co-extensive in cross sectional area with the bar of stock, the body having at its end a conical projection 17, of such size as to leave a shoulder 18 at the end of the body of the punch. The punch 16 is so positioned that in its advance position the end of the body thereof will extend beyond the inner end of the recess 12.

In operation, the plungers being retracted and the dies 2 and 3 being transversely separated, a bar of stock is fed forwardly between the dies 2, and the reciprocable die is advanced to grip the stock in the recess 6 with a portion of the stock projecting beyond the face of the dies 2. The plunger 4 is then advanced and the end of the stock is upset and is formed by the complementary recesses 7 and 8 into the desired shape of the finished nut. At the same time the punch 9 enters the formed end of the bar of stock and partially punches therethrough a hole of the size desired in the finished nut, this hole terminating at its inner end in a conical depression.

In Fig. 5 is shown a bar of stock 20 as it is first fed into the dies 2 and after the actuation of the plunger 4 the end of the bar assumes the form shown in Fig. 7 which illustrates the formed end 22 with the "flash" 23 formed by the spread of the metal between the faces of the die and plunger, the hole 24 extending partially through the formed end 22 and terminating in a conical depression 25. The plunger 4 is then retracted and the dies 2 and 3 separated by movement of the reciprocable pair of dies, and the bar of stock having a formed end is transferred to the recess 11 in one of the dies 3, and the dies closed. When the dies are closed, the flash 23 lies in the enlarged opening 13, while the body of the formed end 22 of the bar of stock lies in the recess 12 on both sides of the enlargement 13. The plunger 5 is then advanced until the conical end of the punch enters the conical depression at the inner end of the hole in the formed end of the bar of stock and continued advancement of the punch forces the stock backwardly through the dies 3, this being permitted because the recess 11 is larger than the bar of stock, and because a very slight clearance is left in the recess 12 and also, of course, because the portion of the recess 12 inwardly beyond the opening 13 is deeper than the recess 7 in the dies 2, and hence deeper than the portion of the formed stock inwardly beyond the flash. As the stock in thus forced back until the inner side of the formed end of the stock comes in contact with the inner end of the recess 12, the flash is trimmed off by the edge of the inner portion of the recess 12, and as the punch still continues thereafter to advance until the end of the body portion reaches the inner end of the recess 12, it punches the hole entirely through the formed end of the bar of stock and thereby severs such end from the remainder of the bar, while the conical end of the punch preserves in the end of the bar of stock, from which the formed end is severed, the conical depression which was initially formed by the end of the punch 9.

Owing to the fact that the recess 11 is larger than the bar of stock the action of the punch 16 will cause a slight enlargement 28 at the end of the bar from which it severs a nut. After operation of the punch 16 the dies 3 are opened and the finished nut 26, having a hole 27 through it, is removed and the bar of stock is transferred to the dies 2 and the cycle of operations continued. The previous formation of the enlargement 28 at the end of the bar requires less metal to be upset in the formation of the succeeding nut. The conical depression 25 in the end of the bar provides a centering for the punch 9, and the partially formed hole in the formed end of the bar, terminating in the preserved conical depression, provides a centering for the punch 16 in the subsequent operation.

I therefore particularly point out and distinctly claim as my invention:—

1. The method of making nuts, which consists of the following steps: upsetting into desired exterior form the end of a bar of stock of substantially uniform cross-section; simultaneously punching partly through such formed end a hole alined with, and at least co-extensive in cross-sectional area with, the bar of stock; and subsequently punching the hole entirely through such formed end.

2. The method of making nuts, which consists of the following steps: upsetting into desired exterior form the end of a bar of stock of substantially uniform cross-section; simultaneously punching partly through such formed end a hole with a conical depression at its inner end, the hole being alined with, and at least co-extensive in cross-sectional area with, the bar of stock; and subsequently punching the hole entirely through such formed end and preserving said conical depression in the end of the bar of stock from which such formed end is severed by the second punching operation.

3. The method of making nuts, which consists of the following steps: upsetting into desired exterior form the end of a bar of stock of substantially uniform cross-section; which has in such end a conical depression; simultaneously punching through such formed end a hole alined with, and at least co-extensive in cross-sectional area with, the bar of stock and preserving said conical depression at the inner end of the hole; and subsequently punching the hole entirely through such formed end and preserving said conical depression in the end of the bar of stock from which such formed end is severed by the second punching operation.

4. The method of making nuts, which consists of the following steps: upsetting into desired exterior form the end of a bar of stock of substantially uniform cross-section which has in such end a conical depression; simultaneously punching partly through such formed end a hole alined with, and at least co-extensive in cross-sectional area with, the bar of stock and preserving said conical depression at the inner end of the hole; and subsequently punching the hole entirely through such formed end and preserving said conical depression in the end of the bar of stock from which such formed end is severed by the second punching operation and simultaneously trimming the periphery of such formed end.

Signed by me, this 27 day of April, 1914.

JOHN R. BLAKESLEE.

Attested by—
C. W. STANSBURY,
H. CREECH.